June 5, 1956 G. S. BROWN 2,748,422
APPARATUS FOR ADVANCING AND WORKING PLASTIC COMPOUNDS
Filed June 21, 1951
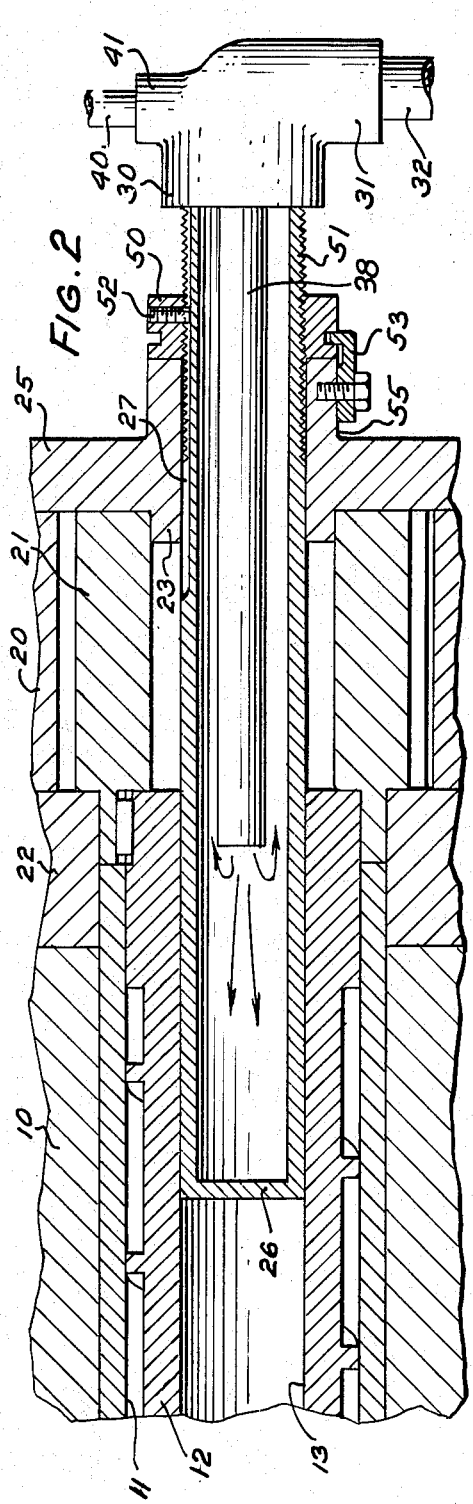
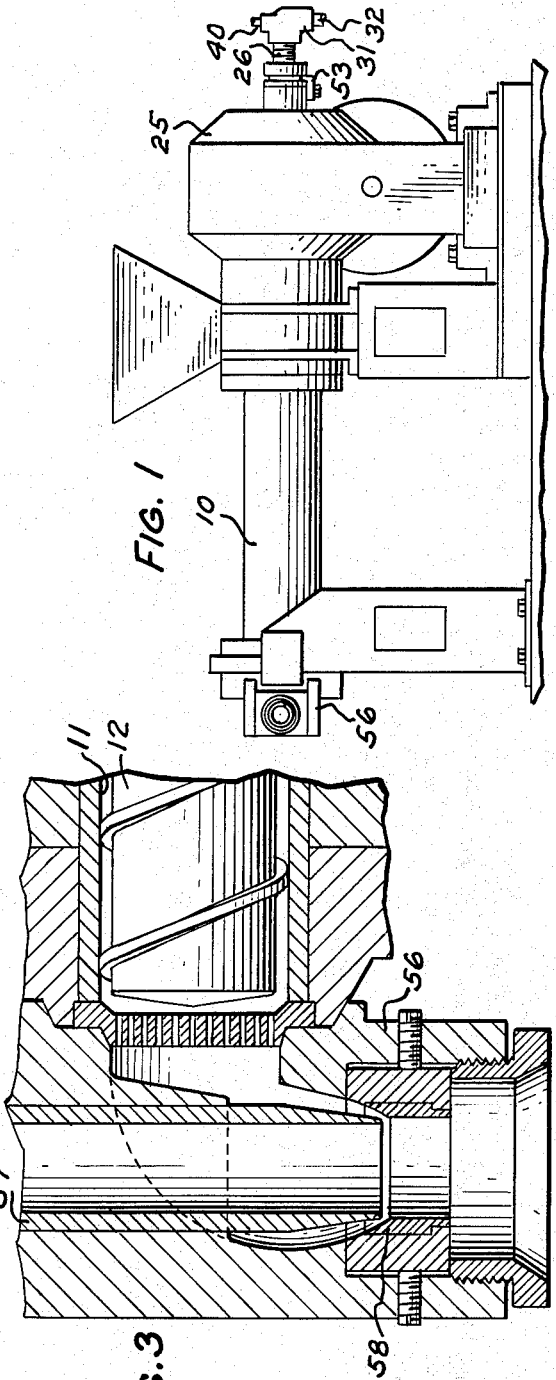
INVENTOR
G. S. BROWN
BY E. A. Kane
ATTORNEY

United States Patent Office 2,748,422
Patented June 5, 1956

2,748,422

APPARATUS FOR ADVANCING AND WORKING PLASTIC COMPOUNDS

Grant S. Brown, Downers Grove, Ill., assignor to Western Electric Company, Incorporated, New York, N. Y., a corporation of New York Application June 21, 1951, Serial No. 232,825

9 Claims. (Cl. 18—12)

This invention relates to apparatus for advancing and working plastic compounds, and more particularly to a cooling system for extrusion apparatus.

Plastic compounds are often used to insulate or jacket conductors and cable cores. It has been proposed in the past to introduce these compounds into an extruder in a relatively unworked or unmixed condition and to work and mix the compounds sufficiently while in the extruder to bring the compounds to a highly extrudable condition. It is essential that such compounds be subjected to considerable work to compact the compound to expel air trapped in the compound and to make the extruded compound homogeneous. However, along some portions of the extruder it is essential to keep the stock screw cool to promote delivering and mixing actions thereof, while just before the compound is extruded, it is essential that the compound be quite hot before it is extruded. Various cooling systems have been suggested in the past, however, none of these have had sufficient flexibility to adapt a single extruder to the wide variety of cooling conditions necessary for extruding many different types of compounds.

An object of the invention is to provide new and improved apparatus for extruding plastic compounds.

A further object of the invention is to provide new and improved cooling systems for extruders.

Another object of the invention is to provide a cooling system for cooling a portion of an extruder stock screw for advancing and mixing plastic compounds in which the portion of the stock screw being cooled may be adjusted without interrupting the operation of the extruder.

An apparatus illustrating certain features of the invention may include an extruder including an extruding cylinder and a hollow stock screw. Conduit means are mounted in the hollow stock screw for cooling a portion thereof, and means are provided for moving the conduit means to different positions along the stock screw so that a heat transfer fluid introduced into the hollow stock screw may be varied.

A complete understanding of the invention may be obtained from the following detailed description of an apparatus forming a specific embodiment thereof, when read in conjunction with the appended drawings in which Fig. 1 is a side elevation of an apparatus forming a specific embodiment of the invention;

Fig. 2 is an enlarged, fragmentary, vertical section of a portion of the apparatus shown in Fig. 1, and Fig. 3 is an enlarged, fragmentary, vertical section of another portion of the apparatus shown in Fig. 1.

Referring now in detail to the drawings, there is shown therein an apparatus for extruding organic plastic compounds, such as, for example, a compound including as the essential ingredient thereof rubber, neoprene (polymerized chloroprene), a copolymer of butadiene and styrene or a thermoplastic material, such as polyethylene, polyvinyl chloride, a copolymer of vinyl chloride and vinyl acetate, or the like, and for controlling the temperature of the material in accordance with the position of the materials along an extruding cylinder 10 having a bore 11 therein. A stock screw 12 having a bore 13 formed therein is rotatably mounted in the cylinder 10, and a stock screw extension (not shown) may be secured to the delivery end of the stock screw 12.

A drive gear 20 (Fig. 2) meshes with a gear 21 keyed to the stock screw 12, and drives the stock screw. The gear 21 is mounted rotatably by fixed bearings 22 and 23 of a housing 25, which take thrust of the screw and prevent longitudinal movement thereof. A tube 26 mounted in the bore 13 in the stock screw 12 has a keyway 27 extending from the righthand end of the tube 26, as viewed in Fig. 2 along a threaded portion 28 of the tube. The tube 26 fits closely in the stock screw 12, and the righthand end of the tube is mounted in a sealing bearing 30 of a fitting 31 supported by the tube 26, and a drain passage in the fitting 31 and a drain pipe 32 communicate with the interior of the tube 26. The lefthand end of the tube 26 is closed completely. A supply tube 38 threaded into a passage formed in the fitting 31 extends along the tube 26 and the stock screw 12 a substantial portion of the length of the tube 26. A supply pipe 40 leading from a supply of a heat exchange fluid, such as, for example, water, oil, or the like, under pressure is threaded into a socket 41 in the fitting 31 communicating with the tube 38.

A collar 50 is screwed onto a threaded portion 51 of the tube 26, and is secured to the tube against relative rotation by a set screw 52 projecting into the keyway 27. When the stock screw rotates, the tube 26 is rotated therewith by friction therebetween. The set screw 52 keys the collar to the tube 26, and a finger 53 secured to a flange 55 of the housing 25 prevents longitudinal shifting of the tube 26 relative to the stock screw 12. An extruding head 56 is secured to the cylinder 10, and has a core tube 57 and a die 58 therein.

Operation

The stock screw is rotated to advance and mix the compound and force it through the die 58 to form a covering over a core. Cold water is supplied to the tube 38, and cools the stock screw through the tube 26 along the portion of the stock screw coextensive with the tube 26. The cooled portion of the stock prevents the plastic material from sticking to the stock screw to keep even the mixing and delivering functions of that portion of the screw. The tube 26 supports the fitting 31, and is rotated with the stock screw 12.

The position of the tube 26 relative to the stock screw 12 may be readily adjusted by loosening the set screw 52 and the finger 53, turning the collar 50 on the tube 26, refastening the set screw, sliding the tube 26 and collar to positions in which the collar abuts the flange 55 and refastening the finger 53. Thus, adjustments may be made quickly and with little effort.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for advancing and working plastic compounds, which comprises an extruding cylinder having a bore therein, a stock screw having a bore therein extending from one end thereof, means for closing the bore in the stock screw at a point between the ends thereof, means connected to the bore-closing means for shifting the bore-closing means along the bore in the screw, and means for supplying a heat exchange fluid to the portion of the bore in the stock screw on one side of the bore-closing means.

2. An apparatus for advancing and working plastic compounds, which comprises an extruding cylinder having a bore therein, a stock screw having a bore therein extending from the entrance end thereof toward the delivery end thereof, means slidable in the bore for closing the bore at a point between the ends thereof, means connected to the bore-closing means extending from said point to the entrance end of the bore for shifting the bore-closing means along the bore, and means for supplying a heat exchange fluid to the portion of the bore in the stock screw on the entrance end side of the bore-closing means.

3. An apparatus for advancing and working plastic compounds, which comprises an extruding cylinder having a bore therein, a stock screw having a bore therein extending from one end thereof, closure means rotatable with the screw closing the bore in the stock screw at a point between the ends thereof, means connected rotatably to the closure means and accessible at one end of the screw for shifting the closure means along the bore, and means for supplying a heat exchange fluid to the portion of the bore on one side of the closure means.

4. An extruder, which comprises an extruding cylinder, a stock screw having a shank portion mounted rotatably in the cylinder and provided with a bore extending therealong from the shank portion toward the delivery end thereof, a tube having a closed end fitting in contact with and slidably into the bore in the stock screw, means for adjusting the tube longitudinally of the stock screw, means for supplying a heat exchange fluid into the tube, and means for withdrawing the fluid from the tube.

5. An extruder, which comprises an extruding screw having a bore extending from one end thereof toward the other end thereof, a tube having a closed end designed to fit slidably into the bore in contact with the wall of the bore, releasable means for locking the tube and the screw against longitudinal relative movement therebetween in any selected position of the tube with respect to the bore, and means for circulating a heat exchange fluid through the tube.

6. An extruder, which comprises an extruding cylinder, a stock screw having a shank portion and mounted rotatably in the cylinder and provided with a bore extending therealong from the shank portion toward the delivery end thereof, a tube having a closed end fitting slidably into the bore in the stock screw, a thrust element fastened adjustably to the tube, a second thrust element fastened against longitudinal movement with respect to the cylinder for engaging the first thrust member so as to permit rotation therebetween and prevent longitudinal movement therebetween, means for supplying a heat exchange fluid to the tube, and means for withdrawing the fluid from the tube.

7. An extruder, which comprises an extruding cylinder having an entrance end and a delivery end, a gear housing mounted at the entrance end of the cylinder, a stock screw having a shank portion and mounted rotatably in the cylinder and the housing in a position in which the shank portion extends into the housing, said screw being provided with a bore extending therealong from the shank portion toward the delivery end thereof, a tube composed of heat-conductive material having a closed end fitting tightly and slidably into the bore in the stock screw, and also provided with an open end extending beyond the housing, thrust bearing means secured adjustably to the tube and fixed to the housing, sealing bearing means secured to the open end of the tube, a pipe extending into the tube, a fitting mounted on the sealing bearing means and supporting the pipe, said fitting having a passage leading from the exterior thereof to the pipe and also being provided with a passage leading from the exterior thereof to the tube, and means for forcing a heat exchange fluid through the tube and the pipe.

8. An extruder, which comprises an extruding cylinder having an entrance end and a delivery end, a gear housing mounted at the entrance end of the cylinder, a stock screw having a shank portion and mounted rotatably in the cylinder and the housing in a position in which the shank portion extends into the housing, said screw being provided with a bore extending therealong from the shank portion toward the delivery end thereof, a tube composed of heat-conductive material having a closed end fitting tightly and slidably into the bore in the stock screw and also provided with an open end extending beyond the housing, the exterior portion of the tube adjacent to the open end thereof being threaded, a collar having an exterior annular groove threaded on the threaded portion of the tube, a set screw for locking the collar to the tube, a finger secured to the housing in a position extending into the groove, sealing bearing means secured to the open end of the tube, a pipe extending into the tube, a fitting mounted on the sealing bearing means and supporting the pipe, said fitting having a passage leading from the exterior thereof to the pipe and also being provided with a passage leading from the exterior thereof to the tube, and means for forcing a heat exchange fluid through the pipe and the tube.

9. An extruder, which comprises an extruding cylinder having an entrance end and a delivery end, a gear housing mounted at the entrance end of the cylinder, a stock screw having a shank portion and mounted rotatably in the cylinder and the housing in a position in which the shank portion extends into the housing, said screw being provided with a bore extending therealong from the shank portion toward the delivery end thereof, a tube composed of heat-conductive material having a closed end fitting tightly and slidably into the bore in the stock screw and also provided with an open end extending beyond the housing, a collar having an exterior annular groove mounted adjustably on the tube, means for locking the collar to the tube, a finger fitting into the groove in the collar and fixed to the housing, sealing bearing means secured to the open end of the tube, a pipe extending into the tube, a fitting mounted on the sealing bearing means and supporting the pipe, said fitting having a passage leading from the exterior thereof to the pipe and also being provided with a passage leading from the exterior thereof to the tube, and means for forcing a heat exchange fluid through the tube and the pipe.

References Cited in the file of this patent

UNITED STATES PATENTS

| | | |
|---|---|---|
| 902,850 | Auchu | Nov. 3, 1908 |
| 1,902,295 | Shook | Mar. 21, 1933 |
| 1,935,050 | Gordon | Nov. 14, 1933 |
| 1,964,600 | Royle | June 26, 1934 |
| 2,641,800 | Myers | June 16, 1953 |